Figure 1:
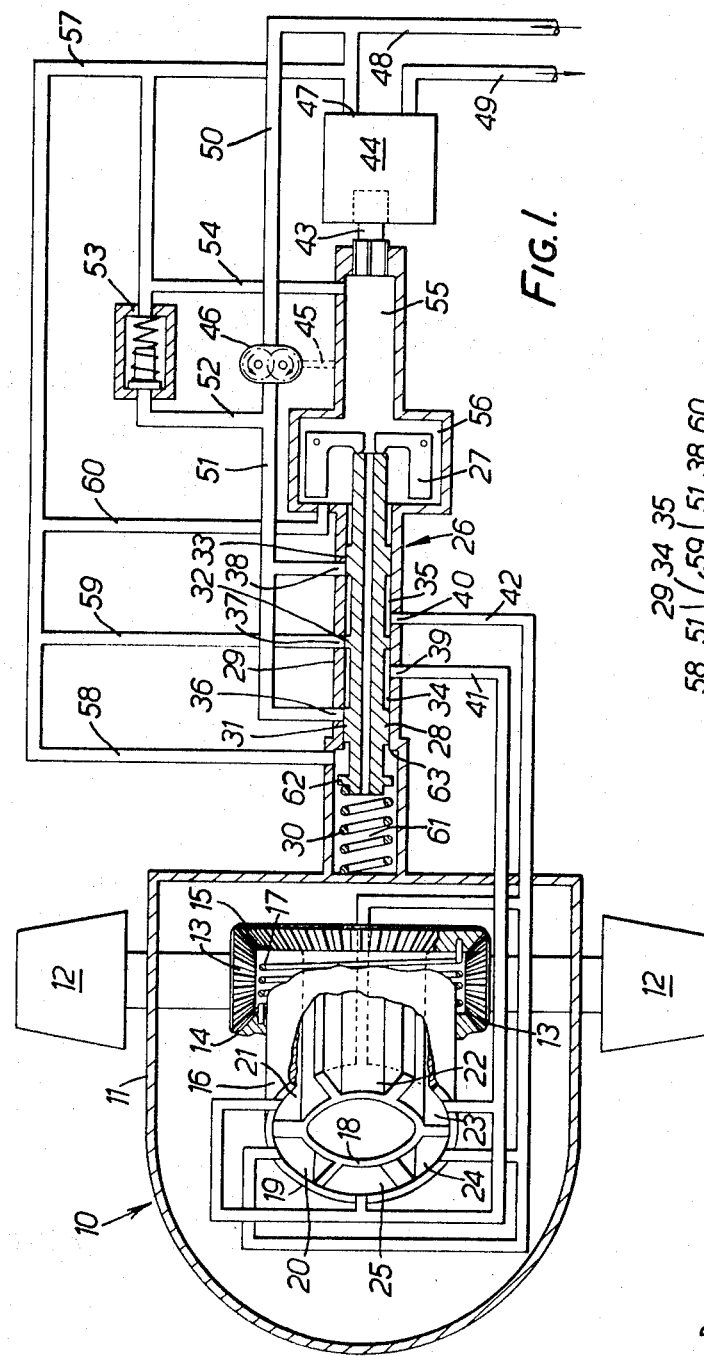

United States Patent
Chilman et al.

[15] 3,635,583
[45] Jan. 18, 1972

[54] RAM-AIR TURBINES

[72] Inventors: John Alfred Chilman, Painswick; Richard James Wall, Churchdown, both of England

[73] Assignee: Dowty Rotol Limited, Gloucester, England

[22] Filed: Nov. 7, 1969

[21] Appl. No.: 874,800

[30] Foreign Application Priority Data

Nov. 15, 1968 Great Britain..................54,236/68

[52] U.S. Cl..............................................416/48, 416/157
[51] Int. Cl.....................................................F01d 7/02
[58] Field of Search.........................416/44–48, 157, 416/52, 9, 40, 49–53; 415/33, 43

[56] References Cited

UNITED STATES PATENTS

| | | | |
|---|---|---|---|
| Re22,034 | 2/1942 | Hoover | 416/48 |
| 2,363,670 | 11/1944 | Hoover | 416/48 |
| 2,745,502 | 5/1956 | Gehres | 416/157 |
| 2,874,787 | 2/1959 | Battenberg et al. | 416/48 |
| 2,986,219 | 5/1961 | Boardman et al. | 416/48 |
| 3,125,960 | 3/1964 | Chilman | 416/45 X |
| 3,339,639 | 9/1967 | Elmes et al. | 416/48 |

FOREIGN PATENTS OR APPLICATIONS

| | | | |
|---|---|---|---|
| 126,484 | 1/1948 | Australia | 416/48 |
| 922,918 | 2/1947 | France | 416/157 |
| 724,316 | 8/1942 | Germany | 416/157 |

*Primary Examiner*—Everette A. Powell, Jr.
*Attorney*—Young & Thompson

[57] ABSTRACT

A ram-air turbine includes a rotor having blades whose pitch is variable, a governor responsive to the rotational speed of the rotor, and an actuator for effecting pitch variation of the blades. A valve is provided whose position is controlled by the governor for directing fluid under pressure to at least one part of the actuator to effect pitch variation in one direction and for directing fluid under pressure to at least one other part of the actuator to effect pitch variation in the other direction when the rotational speed of the rotor is above a predetermined value. The valve is also arranged to connect all the parts of the actuator to a source of low pressure when said speed is below the predetermined value.

13 Claims, 2 Drawing Figures

PATENTED JAN 18 1972

3,635,583

JOHN ALFRED CHILMAN
RICHARD JAMES WALL
INVENTORS

BY Young + Thompson
ATTORNEYS

RAM-AIR TURBINES

This invention relates to ram-air turbines such as are used, for example, on aircraft to drive hydraulic, fuel or other pumps, electric generators or the like.

As used on manned aircraft, ram-air turbines usually constitute auxiliary power units to provide a lightweight and immediately available source of emergency power for the operation of hydraulic, electric or pneumatic services. Such auxiliary power units sometimes take the form of a dropout arrangement, for example being carried at the end of a leg by release of which the unit may be instantaneously moved from a position in which it is stowed within the aircraft to a position out in the airstream. Alternatively, they may be mounted in a duct to which ram-air is admitted by a scoop or other suitable means, itself having entry flap means which is opened for operation of the turbine, so that the turbine will be subject to the aerodynamic ram effect of the particular flight or takeoff conditions.

According to this invention a ram-air turbine includes a rotor having blades whose pitch is variable, a governor responsive to the rotational speed of the rotor, an actuator for effecting pitch variation of the blades, and a valve whose position is controlled by the governor for directing fluid under pressure to one part, or parts of the actuator to effect pitch variation in one direction and for directing fluid under pressure to another part, or parts, of the actuator to effect pitch variation in the other direction, when the rotational speed of the rotor is above a predetermined value, and for connecting all the parts of the actuator to a source of low pressure when said speed is below the predetermined value.

Spring means may be provided in association with the actuator, operative, when said speed is below the predetermined value, to move the blades to a coarse pitch position.

A ram-air turbine in accordance with the invention is particularly suitable for retraction into a stowage zone of the associated aircraft when no longer required to operate, or is particularly suitable for mounting within a duct within the aircraft.

As the ram-air turbine is retracted, or as a scoop to the duct is closed, the rotational speed of the ram-air turbine will fall and when the turbine is fully retracted or the scoop fully closed, the rotor will be nonrotating. The rotor blades will then be at a coarse pitch angle and thus the rotor is in readiness for starting when next it is required to operate.

The actuator may be of piston-and-cylinder type or of vane type, the pressure fluid directed thereto being derived from a pump driven by the ram-air turbine.

The spring means may be interposed between the two components of the actuator, and where the actuator is of the balanced type with both components connected to the blades so as both to contribute to blade pitch adjustment, the spring means acts equally and oppositely upon these components.

Where the actuator is of balanced-vane type, the casing vanes and shaft vanes thereof being both angularly movable, one in a direction opposite to the other in order to apply pitch-changing forces to the rotor blades at diametrically opposite points of the blades, the spring means may comprise a single torsion spring.

The valve may be a spool valve and the governor comprise a pair of flyweights and a speeder spring, all of which are arranged coaxially with respect to the bladed rotor.

Figure 2:
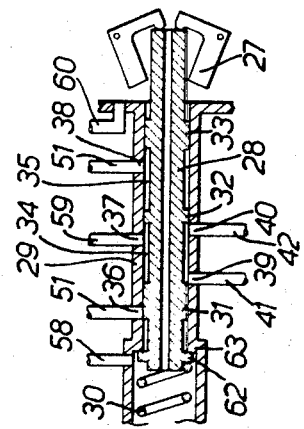

One embodiment of the invention will now be particularly described by way of example with reference to the accompanying diagrammatic drawings, of which, FIG. 1 shows a ram-air turbine and associated control system, and, FIG. 2 shows a portion of the system shown in FIG. 1 in an operating condition different from that shown in FIG. 1.

Referring to FIG. 1 of the drawings, an aircraft ram-air turbine 10 which is mounted upon a strut (not shown) whereby it can be extended into the slipstream of the aircraft and retracted therefrom, includes a hub 11 in which two blades 12 are mounted for pitch-change movement about their longitudinal axes. A bevel gear 13 is mounted at the root end portion of each blade and the output bevel gears 14 and 15 of a balanced-vane type actuator 16 mesh with each of these gears 13 respectively at opposite points thereon.

Spring means in the form of a torsion coil spring 17 is provided between the output bevel gears 14 and 15 in the manner shown, the axis of the spring and the axis of rotation of the gears being coincident with the axis of rotation of the turbine.

A ram-air turbine having a balanced-vane actuator of this type is more fully described in the specification of the application of John Alfred Chilman and Richard James Wall of even date herewith.

In the present embodiment the shaft 18 of the actuator has three vanes and the casing 19 also has three vanes, thereby forming six actuator chambers or parts 20, 21, 22, 23, 24 and 25.

The ram-air turbine 10 includes a rotational speed-responsive governor 26, arranged coaxially with respect to the hub and comprising a pair of pivotally mounted flyweights 27 whose inner end portions bear upon the right-hand end portion in the drawing of a hollow spool 28 which is housed within, and which is cooperable with, a ported sleeve portion 29. A governor speeder spring 30 is interposed between the left-hand end portion of the spool and a suitable abutment in the hub.

The spool 28 has three lands, 31, 32 and 33, two annular chambers 34 and 35 being formed between them with the spool in the neutral position as shown in FIG. 1, the land 31 closes over a port 36 in the sleeve portion 29, while the land 32 closes over a port 37, and the land 33 closes over a port 38, both the ports 37 and 38 being also in the sleeve portion.

Ports 39 and 40, also in the sleeve portion 29, are respectively open to chambers 34 and 35, and are connected respectively to conduits 41 and 42. The conduit 41 which is termed the "coarse pitch conduit" connects with the chambers 21, 23 and 25 of the actuator 16, while the conduit 42 which is termed the "fine pitch conduit" connects with the chambers 20, 22 and 24 of the actuator 16.

The ram-air turbine 10 is connected as at 43 to drive an oil pump 44, and is connected as at 45 to drive a smaller oil pump 46, the latter intended only for use in pitch-change of the turbine blades 12.

The inlet 47 of the pump 44 is connected by a conduit 48 to receive oil under a base pressure of 20 p.s.i. from a reservoir (not shown) within the aircraft, the conduit 48 extending along the strut which supports the ram-air turbine. A conduit 49 parallel to the conduit 48 within the strut is taken from the delivery side of the pump 44 back to the hydraulic system within the aircraft, and in operation of the pump 44 when the ram-air turbine is extended into the aircraft slipstream, oil is delivered into the conduit 49 at a pressure of 3,000 p.s.i.

A branch conduit 50 is taken from the conduit 48 to the inlet of the pump 46, and an outlet conduit 51 is taken from this pump, connecting with the ports 36 and 38 in the sleeve portion 29.

A conduit 52 is taken from the conduit 51 back to the conduit 48 and includes a relief valve 53, while a further conduit 54 is taken from a point in the conduit 52 just downstream of the relief valve 53 to a chamber 55 which opens into a chamber 56 in which the governor flyweights 27 are housed.

At a point further downstream in the conduit 52 a conduit 57 is taken and itself branched into three ports 58, 59 and 60 which respectively connect with the chamber 61 housing the speeder spring 30, the port 37 in the sleeve portion 29, and the chamber 56.

As shown in FIG. 1, the spool 28 is in its neutral position, and assuming that the ram-air turbine is extended into the slipstream of the aircraft the turbine is operating at a constant speed determined by the characteristics of the speeder spring 30. The pump 44 is delivering oil into the aircraft hydraulic system at 3,000 p.s.i., while the delivery from the pump 46 is spilling back through the relief valve 53 to the low-pressure side of the system.

If, for example, the aircraft speed increases, the rotational speed of the ram-air turbine increases beyond the datum value required by the speeder spring, the flyweights 27 moving outwardly about their pivots, displacing the spool 28 to the left in FIG. 1. Hence, oil under pressure from the pump 46 passes from the conduit 51 into the annulas 34 and thence into the coarse pitch conduit 41, whilst the fine pitch conduit 42 is placed in communication with low pressure through the chamber 35, the port 37 and the conduits 59 and 57. Thus the chambers 21, 23 and 25 are pressurized and the chambers 20, 22 and 24 are open to low pressure, whereupon the actuator 16 adjusts the blades 12 in the pitch-coarsening direction, thereby reducing the rotational speed of the ram-air turbine. When the datum constant speed is regained, the flyweights 27 move the spool 28 to its neutral position, whereupon movement of the actuator and thus pitch-change of the blades 12, ceases.

If, conversely, the rotational speed of the ram-air turbine decreases, the system operates in the opposite sense to cause the blades to be reduced in pitch, and appropriate increase in the rotational speed back to the on-speed condition is achieved.

When it is required to stop the operation of the ram-air turbine, this can be achieved by simply retracting the turbine into its stowage zone within the aircraft, but it is desirable that the blades 12, when stopped, are held in a coarse pitch condition in readiness for restarting of the turbine when next it is extended into the slipstream. This is achieved as follows.

During the retraction movement the rotational speed of the turbine commences to fall because the frontal area of the rotating rotor presented to the slipstream becomes less. When the speed reaches a predetermined value, in this embodiment 800 r.p.m., the flyweights 27 have moved sufficiently fair inwardly about their pivots as to allow the spool 28 to move to the right to the position shown in FIG. 2 in which a stop 62 on the spool 28 engages a shoulder 63 on the sleeve portion 29.

In this position, the two conduits 41 and 42 are both open through the ports 39 and 40 to the annular chamber 34, which is itself open through the port 37 to the conduit 59 and thus is open to the conduit 57 on the low pressure side of the system.

Thus, with the ram-air turbine at and below the said predetermined rotational speed of 800 r.p.m., all the chambers 20, 21, 22, 23, 24 and 25 of the actuator 16 are in communication with the low pressure side of the system, and the torsion spring 17 is therefore able to drive the shaft 18 and the casing 19 equally and oppositely such that the bevel gears 14 and 15 place the blades 12 at a coarse pitch angle which is adequate for restarting of the turbine when next extended into the slipstream, without stalling of the turbine occurring. In this embodiment this starting angle is 80° and this is sufficient upon restarting to take the ram-air turbine up to 1,000 r.p.m. at the lowest likely airspeed of the associated aircraft. Thereafter, the governor can take over to move the spool 28 for pitch-fining to bring the turbine to its datum constant speed.

The above-described method of providing a coarse pitch starting angle is automatic upon slowing down of the turbine on retraction and requires no mechanical or other signal to be applied to the interior of the turbine unit.

Although in the above-described embodiment of the invention the ram-air turbine 10 is provided with an actuator of vane type, in other embodiments of the invention, actuators of piston-and-cylinder type may be instead be used.

Again, although in the embodiment described with reference to the drawings spring means are provided between the output bevel gears of the actuator of the turbine, in alternative embodiments no such spring means are provided. Here, the ram-air turbine is not retractable into its stowage zone within the aircraft until the aircraft has landed and stopped, whereupon the blades are turned about their pitch-change axes by hand to their coarse starting angle, the setting of the governor spool valve being as shown in FIG. 2 and permitting this. The rotor is then turned by hand about its rotational axis to a position in which the turbine can be lifted bodily without obstruction, from the extended position, through a suitably shaped aperture in the wall of the aircraft, to its retracted position within the stowage zone.

Although in the embodiment described with reference to the drawings the ram-air turbine 10 is mounted upon a strut for extension into, and retraction from, the aircraft slipstream, in other embodiments of the invention the ram-air turbine may be mounted in a duct to which ram-air is admitted by a scoop or other suitable means having entry flap means which is opened when the associated aircraft is in flight to bring the ram-air turbine into operation.

Further, although the accessory driven by the ram-air turbine in the embodiment described above with reference to the drawings is an hydraulic pump 44 suitable for emergency operation, the accessory in other applications of this invention could be an electrical alternator, a fuel pump or a pneumatic device.

We claim:

1. A ram-air turbine including a body portion, and a rotor mounted so as to be rotatable with respect to said body portion when the turbine is positioned in an airstream, said rotor comprising a hub and blades mounted upon said hub with freedom for movement about their longitudinal axes so that they are variable as to pitch, a double-acting fluid-pressure-operable blade pitch-change actuator, rotatable with said rotor and having at least one pitch-coarsening chamber and at least one pitch-fining chamber, means by which the actuator drives said blades to effect blade pitch variation, a governor rotatable with the rotor and responsive to the rotational speed of the rotor, a valve associated with the governor and adjustable thereby in a normal range, being also adjustable by the governor to a position outside that range when the rotational speed of the rotor falls below a predetermined value, first conduit means connecting said valve to a source of high fluid pressure, second conduit means connecting said valve to a source of low fluid pressure, first ducting means connecting said valve to said pitch-coarsening chamber or chambers, and second ducting means connecting said valve to said pitch-fining chamber or chambers, adjustment of said valve by the governor through its said normal range when said speed is above said predetermined value controlling the supply of pressure fluid to, and the exhaust of fluid from, said actuator for corresponding pitch-change adjustment of the blades in either the pitch-coarsening direction or the pitch-fining direction whereby said speed is maintained substantially constant, and adjustment of the valve by the governor to said position outside that range conditioning said actuator for movement of the blades to a predetermined coarse pitch position.

2. A ram-air turbine as claimed in claim 1, wherein spring means are provided in association with the actuator, operative, when said speed is below the predetermined value, to move the blades to a coarse pitch position.

3. A ram-air turbine as claimed in claim 1, wherein the actuator is of vane-type.

4. A ram-air turbine as claimed in claim 1, wherein said fluid under pressure is derived from a pump driven by the ram-air turbine.

5. A ram-air turbine as claimed in claim 2, wherein said spring means is interposed between the two components of the actuator.

6. A ram-air turbine as claimed in claim 2, wherein the actuator is of the balanced type with both components connected to the blades so as both to contribute to blade pitch adjustment, the spring means acting equally and oppositely upon these components.

7. A ram-air turbine as claimed in claim 2, wherein the actuator is of balanced-vane type, the casing vanes and shaft vanes of which are both angularly movable, one in a direction opposite to the other in order to apply pitch-changing forces to the rotor blades at diametrically opposite points of the blades.

8. A ram-air turbine as claimed in claim 7, wherein said spring means comprises a single torsion spring.

9. A ram-air turbine as claimed in claim 1, wherein said valve is a spool valve and the governor comprises a pair of flyweights and a speeder spring, all of which are arranged coaxially with respect to the bladed rotor.

10. A ram-air turbine as claimed in claim 1, and so constructed as to be mountable upon an aircraft in a manner affording extendability of the turbine from a stowage zone within the aircraft into the slipstream of the aircraft, and retractability from the slipstream into the stowage zone.

11. A ram-air turbine including a body portion, and a rotor mounted so as to be rotatable with respect to said body portion when the turbine is positioned in an airstream, said rotor comprising a hub and blades mounted upon said hub with freedom for movement about their longitudinal axes so that they are variable as to pitch, a double-acting fluid-pressure-operable blade pitch-change actuator, rotatable with said rotor and having at least one pitch-coarsening chamber and at least one pitch-fining chamber, means by which the actuator drives said blades to effect blade pitch variation, spring means provided in association with said actuator for biassing it in a manner corresponding to pitch-coarsening of the blades, a governor rotatable with the rotor and responsive to the rotational speed of the rotor, a valve rotatable with the rotor and adjustable by the governor in a normal range, being also adjustable by the governor to a position outside that range when the rotational speed of the rotor falls below a predetermined value, first conduit means connecting said valve to a source of high fluid pressure, second conduit means connecting said valve to a source of low fluid pressure, first ducting means connecting said valve to said pitch-coarsening chamber or chambers and second ducting means connecting said valve to said pitch-fining chamber or chambers, adjustment of said valve by the governor through its said normal range when said speed is above said predetermined value controlling the supply of pressure fluid to, and the exhaust of fluid from, said actuator for corresponding pitch-change adjustment of the blades in either the pitch-coarsening direction or the pitch-fining direction whereby said speed is maintained substantially constant, and adjustment of the valve by the governor to said position outside that range, which occurs upon such repositioning of the ram-air turbine in relation to the airstream as causes said speed to fall below said predetermined value, simultaneously placing said pitch-coarsening and pitch-fining chambers in communication with said low pressure source whereby said spring means automatically adjusts the actuator so that it moves the blades to a predetermined coarse-pitch position.

12. A ram-air turbine including a body portion, and a rotor mounted so as to be rotatable with respect to said body portion when the turbine is positioned in an airstream, said rotor comprising a hub and blades mounted upon said hub with freedom for movement about their longitudinal axes so that they are variable as to pitch, a double-acting fluid-pressure-operable blade pitch-change actuator of balanced-vane type, rotatable with said rotor and having at least one pitch-coarsening chamber and at least one pitch-fining chamber, means by which the actuator drives said blades to effect blade pitch variation, casing vanes and shaft vanes of said actuator being both angularly movable, the casing vanes in a direction opposite to the shaft vanes in order to apply pitch-changing force through said means to each said blade at diametrically opposite points thereon, a torsion spring provided in association with said actuator for biasing it in a manner corresponding to pitch-coarsening of the blades, a governor rotatable with the rotor and responsive to the rotational speed of the rotor, a valve rotatable with the rotor and adjustable by the governor in a normal range, being also adjustable by the governor to a position outside that range when the rotational speed of the rotor, falls below a predetermined value, first conduit means connecting said valve to a source of high fluid pressure, second conduit means connecting said valve to a source of low fluid pressure, first ducting means connecting said valve to said pitch-coarsening chamber or chambers, and second ducting means connecting said valve to said pitch-fining chamber or chambers, adjustment of said valve by the governor through its said normal range when said speed is above said predetermined value controlling the supply of pressure fluid to, and the exhaust of fluid from, said actuator for corresponding pitch-change adjustment of the blades in either the pitch-coarsening direction or the pitch-fining direction whereby said speed is maintained substantially constant, and adjustment of the valve by the governor to said position outside that range, which occurs upon such repositioning of the ram-air turbine in relation to the airstream as causes said speed to fall below said predetermined value, simultaneously placing said pitch-coarsening and pitch-fining chambers in communication with said low pressure source whereby said torsion spring automatically adjusts the actuator so that it moves the blades to a predetermined coarse-pitch position.

13. A ram-air turbine including a rotor having blades whose pitch is variable, a governor responsive to the rotational speed of the rotor, an actuator of balanced-vane type, the casing vanes and shaft vanes of which are both angularly movable, one in a direction opposite to the other in order to apply pitch-changing forces to the rotor blades at diametrically opposite points of the blades for effecting pitch variation of the blades, and a valve whose position is controlled by the governor for directing fluid under pressure to at least one part of the actuator to effect pitch variation in one direction and for directing fluid under pressure to at least one other part of the actuator to effect pitch variation in the other direction, when the rotational speed of the rotor is above a predetermined value, and for connecting all the part of the actuator to a source of low pressure when said speed is below the predetermined value, and spring means comprising a single torsion spring associated with the actuator, operative when said speed is below the predetermined value, to move the blades to a coarse pitch position.

* * * * *